(12) United States Patent
Ryu

(10) Patent No.: US 8,893,052 B2
(45) Date of Patent: Nov. 18, 2014

(54) SYSTEM AND METHOD FOR CONTROLLING MOBILE TERMINAL APPLICATION USING GESTURE

(75) Inventor: Yun Gwan Ryu, Seoul (KR)

(73) Assignee: Pantech Co., Ltd., Seoul (KR)

( * ) Notice: Subject to any disclaimer, the term of this patent is extended or adjusted under 35 U.S.C. 154(b) by 756 days.

(21) Appl. No.: 12/477,579

(22) Filed: Jun. 3, 2009

(65) Prior Publication Data
US 2010/0122167 A1  May 13, 2010

(30) Foreign Application Priority Data
Nov. 11, 2008 (KR) .................. 10-2008-0111587

(51) Int. Cl.
| | | |
|---|---|---|
| *G06F 3/033* | (2013.01) | |
| *G11B 27/34* | (2006.01) | |
| *G06F 3/0488* | (2013.01) | |
| *G11B 27/10* | (2006.01) | |
| *H04M 1/725* | (2006.01) | |

(52) U.S. Cl.
CPC ........... *G11B 27/34* (2013.01); *H04M 1/72558* (2013.01); *G06F 3/04883* (2013.01); *H04M 2250/22* (2013.01); *G11B 27/105* (2013.01)
USPC .......................................... 715/863; 715/700

(58) Field of Classification Search
USPC ........................................................ 715/863
See application file for complete search history.

(56) References Cited

U.S. PATENT DOCUMENTS

| | | | | |
|---|---|---|---|---|
| 6,204,852 B1* | 3/2001 | Kumar et al. | ................. | 345/419 |
| 6,212,541 B1* | 4/2001 | McAuliffe et al. | ........... | 718/100 |
| 6,249,606 B1* | 6/2001 | Kiraly et al. | .................. | 382/195 |
| 6,647,145 B1* | 11/2003 | Gay | .............................. | 382/187 |
| 2002/0135618 A1* | 9/2002 | Maes et al. | ..................... | 345/767 |
| 2004/0023646 A1* | 2/2004 | Inami et al. | .................... | 455/418 |
| 2004/0073935 A1* | 4/2004 | Kang | .............................. | 725/88 |
| 2005/0212760 A1* | 9/2005 | Marvit et al. | ................. | 345/156 |
| 2006/0010400 A1* | 1/2006 | Dehlin et al. | ................. | 715/856 |
| 2006/0026521 A1* | 2/2006 | Hotelling et al. | ............. | 715/702 |
| 2006/0123353 A1* | 6/2006 | Matthews et al. | ............. | 715/779 |
| 2006/0132455 A1* | 6/2006 | Rimas-Ribikauskas et al. | ............................ | 345/173 |
| 2006/0187196 A1* | 8/2006 | Underkoffler et al. | ........ | 345/156 |
| 2006/0242607 A1* | 10/2006 | Hudson | ........................ | 715/863 |

(Continued)

FOREIGN PATENT DOCUMENTS

| | | |
|---|---|---|
| JP | 09-305300 | 11/1997 |
| JP | 2003-162355 | 6/2003 |

(Continued)

*Primary Examiner* — Matt Kim
*Assistant Examiner* — Mahelet Shiberou
(74) *Attorney, Agent, or Firm* — H.C. Park & Associates, PLC

(57) ABSTRACT

A system and a method for controlling a mobile terminal application using a gesture may identify a gesture corresponding to a contact signal input to a display screen. The gesture may then be verified in an event table as corresponding to a command event for one of many possible different applications, and command event may be performed by an application associated with the gesture. The application may be running in the background of the mobile terminal, and may not be displayed on the mobile terminal display screen when the command event is executed. The method may include executing a first application, executing a second application while executing the first application, identifying a gesture corresponding to a contact signal, verifying a command event corresponding to the gesture, and controlling the first application to perform the command event.

20 Claims, 12 Drawing Sheets

(56) References Cited

U.S. PATENT DOCUMENTS

| | | | |
|---|---|---|---|
| 2007/0136677 A1* | 6/2007 | Agarwal | 715/767 |
| 2007/0177803 A1* | 8/2007 | Elias et al. | 382/188 |
| 2007/0277124 A1* | 11/2007 | Shin et al. | 715/863 |
| 2008/0036743 A1* | 2/2008 | Westerman et al. | 345/173 |
| 2008/0059915 A1* | 3/2008 | Boillot | 715/863 |
| 2008/0089587 A1* | 4/2008 | Kim et al. | 382/190 |
| 2008/0168401 A1* | 7/2008 | Boule et al. | 715/863 |
| 2008/0194323 A1* | 8/2008 | Merkli et al. | 463/30 |
| 2008/0243501 A1* | 10/2008 | Hafsteinsson et al. | 704/235 |
| 2010/0162182 A1* | 6/2010 | Oh et al. | 715/863 |

FOREIGN PATENT DOCUMENTS

| | | |
|---|---|---|
| JP | 2008-203973 | 9/2008 |
| JP | 2008-236687 | 10/2008 |
| KR | 1020060085850 | 7/2006 |
| KR | 1020080009415 | 1/2008 |
| WO | 2008/016936 | 2/2008 |

* cited by examiner

FIG. 7

<EVENT TABLE>

| APPLICATION | IDENTIFICATION INFORMATION | COMMAND EVENT | GESTURE |
|---|---|---|---|
| MUSIC PLAYER | △ | START REPRODUCTION ▶ | O |
| | | STOP REPRODUCTION ❚❚ | O |
| | | SELECT NEXT MUSIC ▶▶❘ | > |
| | | SELECT PREVIOUS MUSIC ❘◀◀ | < |
| | | INCREASE REPRODUCTION SOUND | ∧ |
| | | REDUCE REPRODUCTION SOUND | ∨ |
| HOLD APPLICATION | □ | CANCEL HOLD | ╱ |
| | | ⋮ | |

US 8,893,052 B2

SYSTEM AND METHOD FOR CONTROLLING MOBILE TERMINAL APPLICATION USING GESTURE

CROSS-REFERENCE TO RELATED APPLICATION

This application claims priority from and the benefit of Korean Patent Application No. 10-2008-0111587, filed on Nov. 11, 2008, which is hereby incorporated by reference for all purposes as if fully set forth herein.

BACKGROUND OF THE INVENTION

1. Field of the Invention

The present invention relates to a system and method for controlling a mobile terminal application using a gesture to more easily perform a command event corresponding to the gesture by a background application driven in the mobile terminal.

2. Discussion of the Background

As the demand for mobile terminals has increased, mobile terminals have been developed with a wireless Internet service function and a document composition/editing function as well as a conventional voice communication function and a simple Short Message Service (SMS) function.

These mobile terminals may include applications providing various and convenient functions such as a voice or visual communication performing application, a message transmission/reception application such as short message service (SMS) or Multimedia Messaging System (MMS), a mail client, an application exposing an idle-screen in a desktop of a mobile terminal, a photography application, a photo displaying application, a media player for playing media files, an application providing satellite/ground wave Digital Multimedia Broadcasting (DMB), a game application, and the like. Also, as third generation (3G) mobile communication services such as wireless broadband (WiBro), wideband code division multiple access (WCDMA), high speed downlink packet access (HSDPA), and the like have been commercialized, the mobile terminals may include applications such as a mobile Internet browser to provide wireless Internet services.

Thus, consumer demand has sought to concurrently run and use numerous applications included in the mobile terminal. For example, when receiving a message while listening to music through a media player, a user may execute a message transmission/reception application of the mobile terminal to check the received message without terminating the execution of the media player completely.

In this instance, the media player may be a "background application" that is executed but not displayed on a display screen of the mobile terminal, and the message transmission/reception application may be a "foreground application," that is displayed on the screen while being executed. In this application, the term "foreground application" also specifically includes, without limitation, an idle-screen showing a desktop or desktop wallpaper of a mobile terminal.

A conventional mobile terminal may directly perform a control with respect to the foreground application. However, a conventional mobile terminal may not directly perform a control with respect to the background application. Specifically, to perform a control with respect to a media player executed as the background application in the mobile terminal, the media player must be displayed on the screen as the foreground application. In this way, a direct control may be performed in the media player through operations with respect to the mobile terminal.

SUMMARY OF THE INVENTION

The present invention provides a system and method for controlling a mobile terminal application using a gesture, which may correspond to a command event to be performed by the mobile terminal application.

The present invention also provides a system and method for controlling a mobile terminal application using a gesture, where the gesture is applied without key input as a contact on a display screen of the mobile terminal and corresponds to a command event to be performed by a target application of the mobile terminal.

The present invention also provides a system and method for controlling a mobile terminal application using a gesture, where the system and method may control a background application not being displayed on a display screen of the mobile terminal using a gesture in accordance with a contact signal generated in a display screen.

The present invention also provides a system and method for controlling a mobile terminal application using a gesture, where the system and method may provide an interface for registering a gesture in an event table to correspond to a command event, and may verify a gesture applied to the mobile terminal display screen by referring to the event table to control the mobile terminal application.

Additional features of the invention will be set forth in the description which follows, and in part will be apparent from the description, or may be learned by practice of the invention.

The present invention discloses a method for controlling a mobile terminal application using a gesture, including: executing a first application, executing a second application while executing the first application; identifying a gesture corresponding to a contact signal; verifying a command event corresponding to the gesture; and controlling the first application to perform the command event.

The present invention also discloses a method for controlling a mobile terminal application using a gesture, including: executing a plurality of applications; determining a target application from among the plurality of applications based on a contact signal generated in a display screen; identifying a gesture corresponding to the contact signal; verifying a command event corresponding to the gesture; and controlling the target application to perform the command event.

The present invention also discloses a system to control a mobile terminal application using a gesture, including: an application executing unit to execute a first application, and to execute a second application while executing the first application; a gesture identifying unit to identify a gesture corresponding to a contact signal; a command event verifying unit to verify a command event corresponding to the gesture; and an application controlling unit to control the first application to perform the command event.

The present invention also discloses a system to control a mobile terminal application using a gesture, including: an application executing unit to execute a plurality of applications, and to determine a target application from among the plurality of applications based on a contact signal generated in a display screen; a gesture identifying unit to identify a gesture corresponding to the contact signal; a command event verifying unit to verify a command event corresponding to the gesture; and an application controlling unit to control the target application to perform the command event.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 7 illustrates an example of an event table in a system to control a mobile terminal application using a gesture according to an exemplary embodiment of the present invention.

DETAILED DESCRIPTION OF THE ILLUSTRATED EMBODIMENTS

Figure 1:
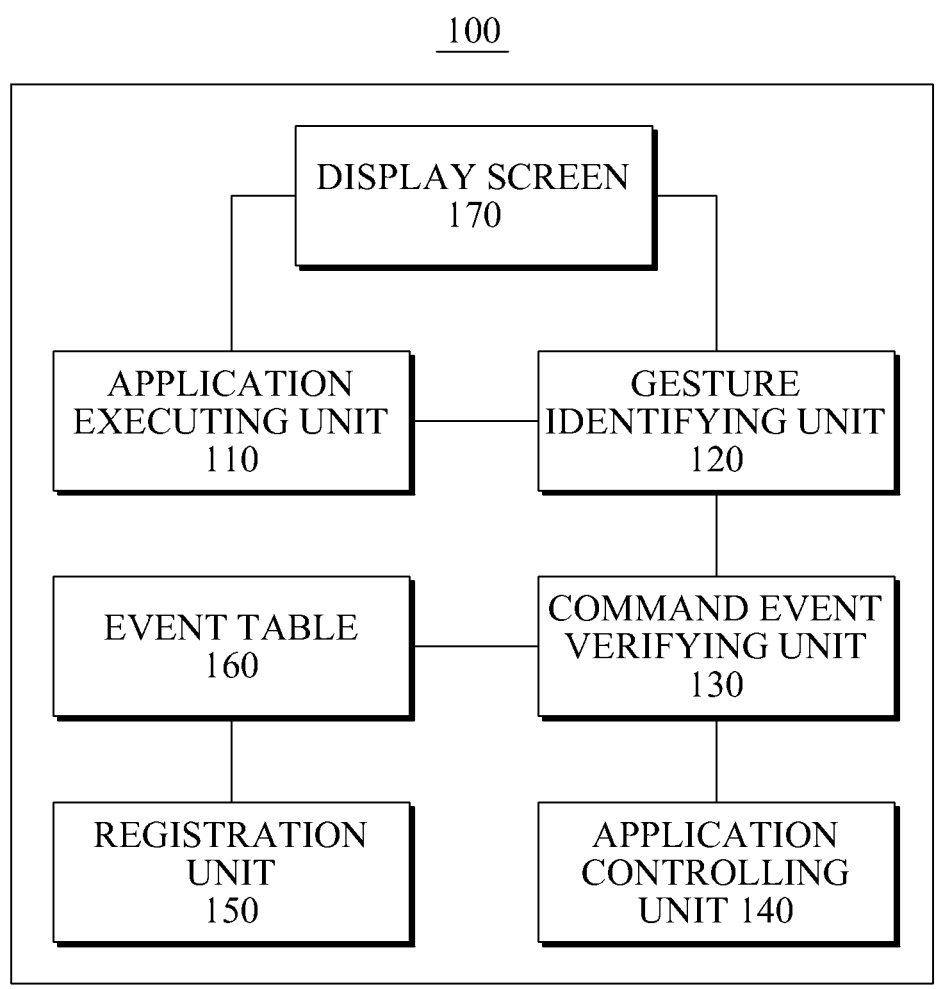
FIG. 1 illustrates a system to control a mobile terminal application using a gesture according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

A system to control a mobile terminal application using a gesture according to the exemplary embodiments may be externally or internally arranged in the mobile terminal. However, in the present specification, simply for convenience of description, the system will be described as if it were internally arranged. In general, 'gesture' may designate an action or movement that a user may make with a part of the user's body to express emotion or information as defined in dictionaries. However, in the present specification, 'gesture' refers to a sort of image identified when a contact signal is generated on a display screen of a mobile terminal, and may be an image coinciding with an outline, shape, or path followed by a pointer generating the contact signal on the display screen. Further, it is expected that there will be an allowable range or tolerance between an actual path followed by a pointer, such as a user's finger, and the gesture recognized by the mobile terminal. The allowable range or tolerance may be defined by the starting coordinates, ending coordinates, intermediate coordinates, or interrelationships there between, including, for example, angle formed between two or more coordinates. Additionally, the allowable range or tolerance may depend on the number of registered gestures or available gestures of a system. For example, an oval traced on a display screen may be recognized as a circle gesture for purposes of identifying the gesture if there is no oval gesture recognized by the system. However, if there is an oval gesture recognized by the system, the allowable range or tolerance of a circle gesture may be reduced to avoid the system misidentifying an inputted gesture. Here, the pointer may be a user's finger or a pen that contacts the display screen. For reference, in FIG. 4, a partial gesture list 410 capable of being registered to correspond to a command event is illustrated.

FIG. 1 illustrates a system to control a mobile terminal application using a gesture according to an exemplary embodiment of the present invention.

The system 100 includes an application executing unit 110, a gesture identifying unit 120, a command event verifying unit 130, an application controlling unit 140, a registration unit 150, an event table 160, and a display screen 170.

The registration unit 150 may provide an interface to the display screen 170 to register, in the event table 160, a gesture inputted through the interface to correspond to a command event.

Here, the command event may be a control operation to be performed with respect to an application executed in the mobile terminal. For example, the command event may include a start/stop playing event, a select next music event, a select previous music event, an increase/decrease playback volume event, and the like in association with a 'music player', that is, an application reproducing a multimedia file, such as an MP3 file, an MPEG-4 file, or any other format of file corresponding to music, sound, still images, or video, or any combination thereof.

The registration unit 150 may register, in the event table 160, a gesture inputted through the interface associated with one or more command events to correspond to those command events.

Figure 4:
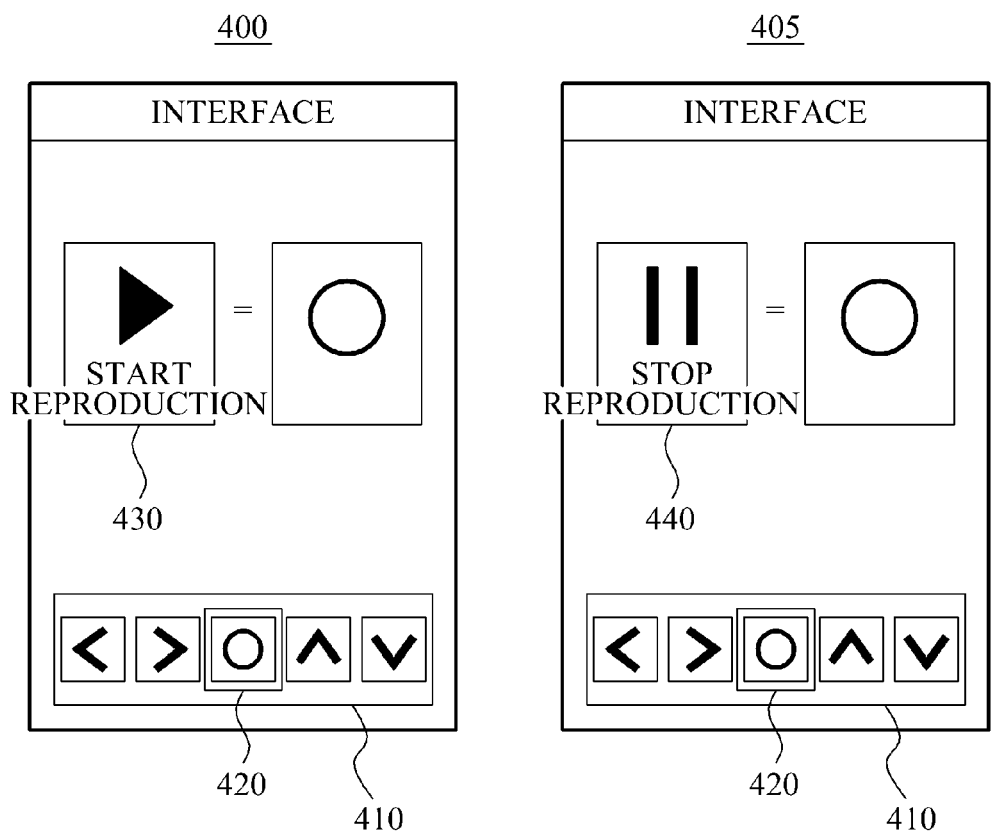
FIG. 4 and FIG. 5 illustrate examples of registering a gesture to correspond to a command event in a system to control a mobile terminal application using a gesture according to an exemplary embodiment of the present invention.
Figure 5:
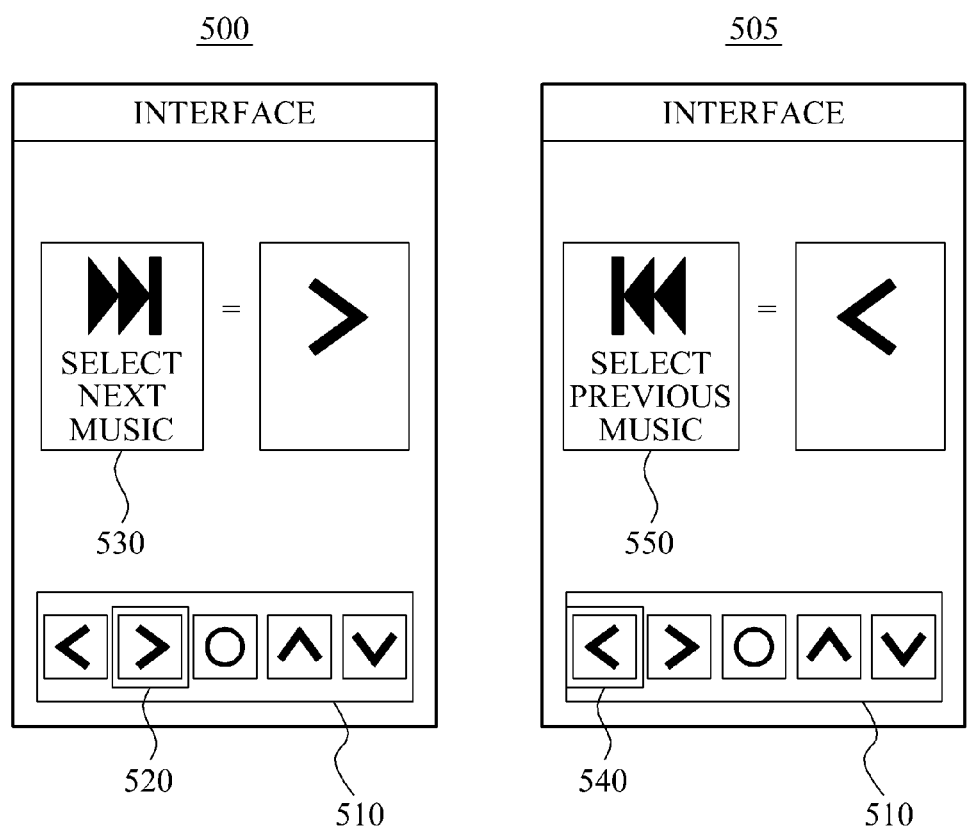

FIG. 4 and FIG. 5 illustrate examples of registering a gesture to correspond to a command event in a system to control a mobile terminal application using a gesture according to an exemplary embodiment of the present invention.

As illustrated in a screen 400 of FIG. 4, registering a gesture corresponding to a 'start reproduction' event 430 of a command event is shown.

For example, the registration unit 150 may provide, on the display screen 170 as illustrated in a screen 400 of FIG. 4, an interface for the 'start reproduction' event 430 of a media with respect to the 'music player'. The interface may include the gesture list 410 for registration of gestures. A gesture designated according to a selection 420 from the gesture list 410 may be registered in the event table 160 to correspond to the 'start reproduction' event 430.

As illustrated in a screen 405 of FIG. 4, registering a gesture corresponding to a 'stop reproduction' event 440 of a command event is shown.

For example, the registration unit 150 may provide, on the display screen 170 as illustrated in a screen 405 of FIG. 4, an interface for the 'stop reproduction' event 440 of the media with respect to the 'music player'. The interface may include the gesture list 410 for registration of gestures. A gesture designated according to the selection 420 from the gesture list 410 may be registered in the event table 160 to correspond to the 'stop reproduction' event 440.

In this instance, if an identical gesture is registered to correspond to different command events such as the 'start reproduction' event 430, and the 'stop reproduction' event 440, the gesture may be used as a toggle switch, whereby a first input of the gesture will perform the first command event, and a second input of the gesture will perform the second command event. Alternatively, if an identical gesture is attempted to be registered to correspond to different command events, the gesture may be locked to the first command event so that it cannot be registered also to the second command event, or the registration may be updated so the gesture corresponds to only the second command event and not the first command event. In this scenario, upon entering a gesture for a second command event that is identical to a gesture already corresponding to a first command event, the user may be given a choice to select how the gesture will be corresponded in the event table, or the system 100 may be preprogrammed with a default setting when this occurs. In this instance, the user may be given an option to override the default setting.

As illustrated in a screen 500 of FIG. 5, registering a gesture corresponding to a 'next music selection event' 530 of a command event is shown.

For example, the registration unit 150 may provide, on the display screen 170 as illustrated in a screen 500 of FIG. 5, an interface for the 'next music selection event 530' of the media with respect to the 'music player'. The interface may include a gesture list 510 for registration of gestures. A gesture designated according to a selection 520 from the gesture list 510 may be registered in the event table 160 to correspond to the 'next music selection event' 530.

As illustrated in a screen 505 of FIG. 5, registering a gesture corresponding to a 'select previous music' event 550 of a command event is shown.

For example, the registration unit 150 may provide, on the display screen 170 as illustrated in a screen 505 of FIG. 5, an interface for the 'select previous music' event 550 of the media with respect to the 'music player'. The interface may include the gesture list 510 for registration of gestures. A gesture designated according to a selection 540 from the gesture list 510 may be registered in the event table 160 to correspond to the 'select previous music' event 550.

Gestures may also be registered to correspond to execution events, such as an event whereby an application is executed to run on the mobile terminal. The mobile terminal may include various applications, such as music player and message transmission/reception program, and the registration unit 150 may register, in the event table 160, a gesture inputted through an interface associated with an execution event for one or more applications to correspond to those applications.

Figure 6:
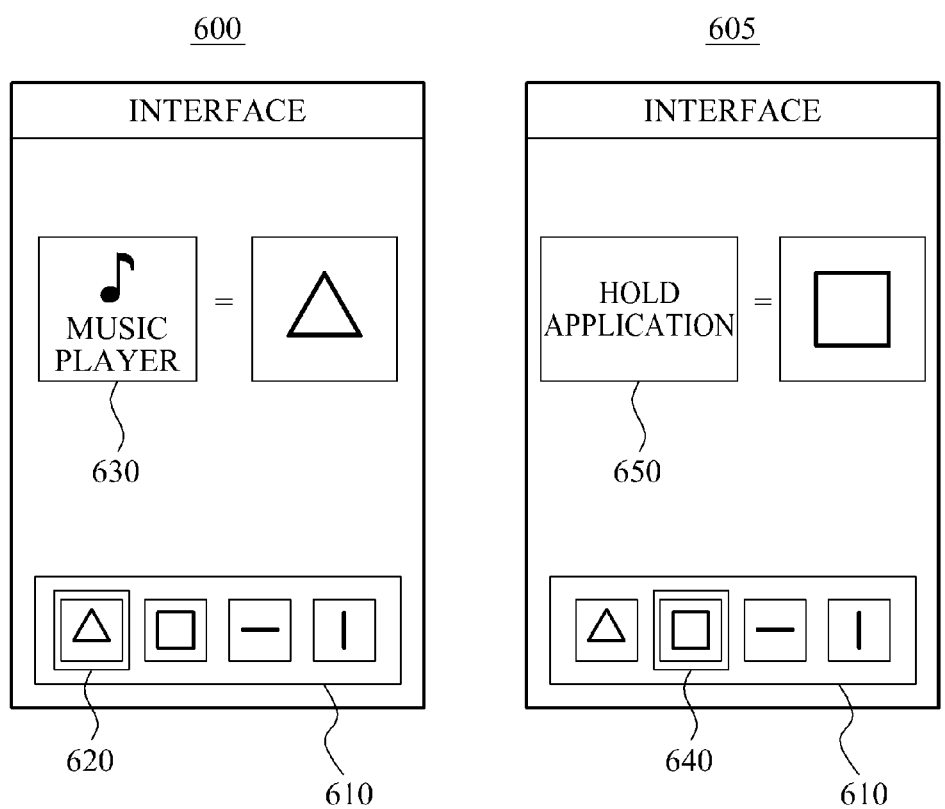
FIG. 6 illustrates examples of registering a gesture to correspond to an application execution event in a system to control a mobile terminal application using a gesture according to an exemplary embodiment of the present invention.

FIG. 6 illustrates examples of registering a gesture to correspond to an application execution event in a system to control a mobile terminal application using a gesture according to an exemplary embodiment of the present invention.

As illustrated in a screen 600 of FIG. 6, registering a gesture corresponding to a 'music player' execution event 630 of a command event is shown.

For example, the registration unit 150 may provide, on the display screen 170 as illustrated in a screen 600 of FIG. 6, an interface for the 'music player' execution event 630. The interface may include a gesture list 610 for registration of gestures. A gesture designated according to a selection 620 from the gesture list 610 may be registered in the event table 160 to correspond to the 'music player' execution event 630.

As illustrated in a screen 605 of FIG. 6, registering a gesture corresponding to a 'hold application' execution event 650 of a command event is shown.

For example, the registration unit 150 may provide, on the display screen 170 as illustrated in a screen 605 of FIG. 6, an interface for the 'hold application' execution event 650. The interface may include the gesture list 610 for registration of gestures. A gesture designated according to a selection 640 from the gesture list 610 may be registered in the event table 160 to correspond to the 'hold application' execution event 650. Here, the 'hold application' may designate an application for setting a touch screen to an idle state so that the touch screen is not used. This may reduce the risk of a portable terminal malfunction from an unintentional touch on the portable terminal touch screen.

As described above, a gesture inputted through an interface associated with an application execution event may act as identification information for an application, and may be registered in the event table 160 to correspond to that application.

FIG. 7 illustrates an example of an event table in a system to control a mobile terminal application using a gesture according to an exemplary embodiment of the present invention.

The event table 160 may register a gesture corresponding to a command event for an application such as 'music player' and 'hold application' as illustrated in FIG. 7.

The application executing unit 110 may execute a second application while the first application is executed.

For example, the application executing unit 110 may execute a 'message transmission/reception program' (that is, a second application) for verifying a received message according to a gesture corresponding to that command event while executing the 'music player' (that is, a first application) to reproduce media.

Also, the application executing unit 110 may execute the 'hold application' (that is, a second application) according to a gesture corresponding to that command event while executing the 'music player' (that is, a first application) to reproduce media.

In this instance, the 'music player' (that is, the first application) may be a background application that is not displayed on a screen while being executed in the mobile terminal, and the message transmission/reception program or the 'hold application' (that is, the second application) may be a foreground application that is displayed on the screen while the first application is executed in the mobile terminal.

Also, the application executing unit 110 may execute the first application or the second application depending on an identified gesture associated with an application execution event, if that gesture corresponds to the first application or the second application, respectively.

Figure 2:
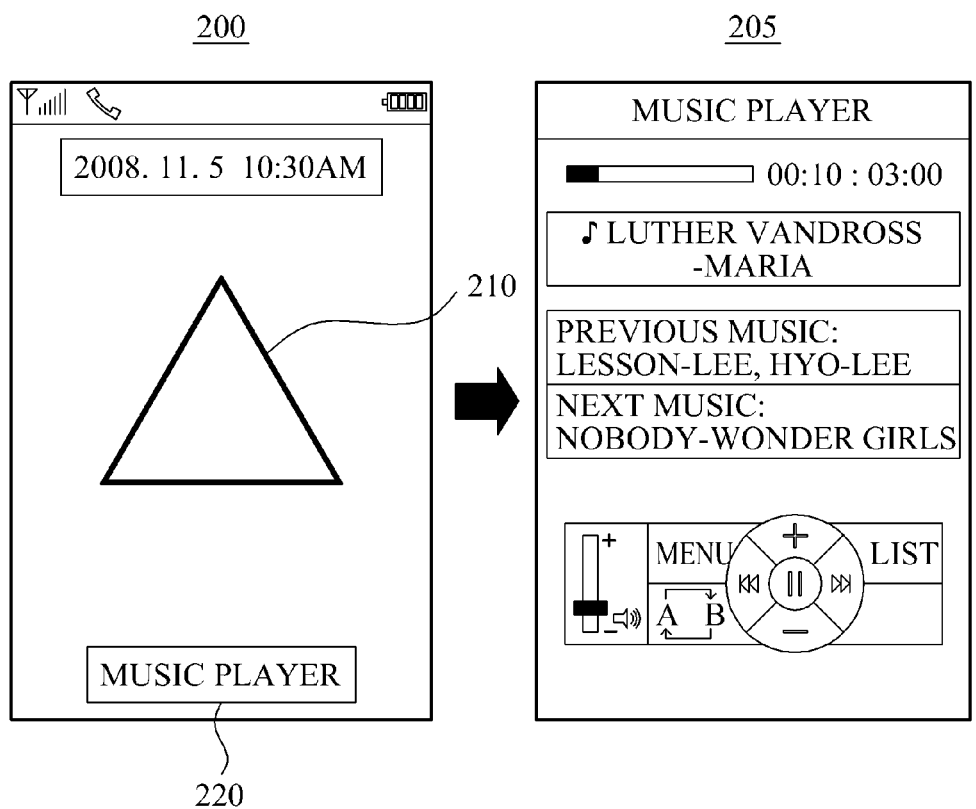
FIG. 2 illustrates an example of executing a first application using a gesture in a system to control a mobile terminal application using a gesture according to an exemplary embodiment of the present invention.

FIG. 2 illustrates an example of executing a first application using a gesture in a system to control a mobile terminal application using a gesture according to an exemplary embodiment of the present invention.

For example, as illustrated in a screen 200 of FIG. 2, when a gesture 210 associated with a 'music player' execution event 220 is input to the mobile terminal in which an application, such as the 'music player', is not being executed, the application executing unit 110 may execute the 'music player' as the first application.

Figure 3:
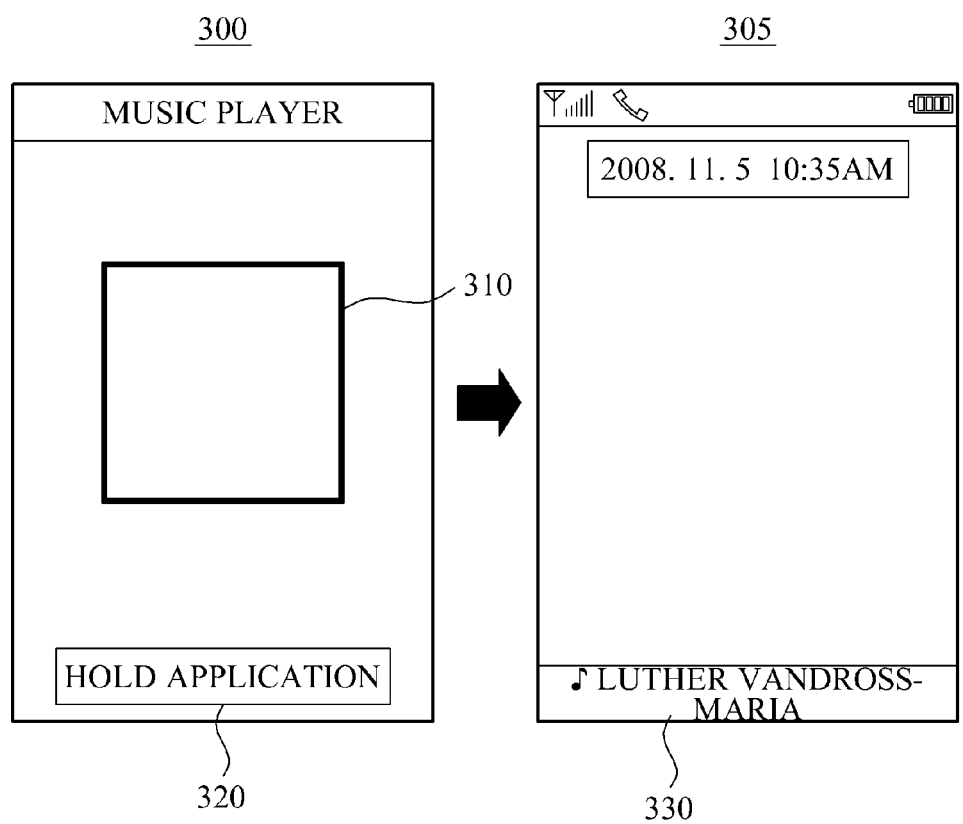
FIG. 3 illustrates an example of executing a second application using a gesture while executing a first application in a system to control a mobile terminal application using a gesture according to an exemplary embodiment of the present invention.

FIG. 3 illustrates an example of executing a second application using a gesture while executing a first application in a system to control a mobile terminal application using a gesture according to an exemplary embodiment of the present invention.

As illustrated in a screen 300 of FIG. 3, when a gesture 310 associated with a 'hold application' execution event 320 is input to the display screen 170 while a first application, such as the 'music player', is executed, the application executing unit 110 may execute the 'hold application' as the foreground application, as illustrated in a screen 305 of FIG. 3. In this instance, the application executing unit 110 may execute the executed 'music player' as the background application of the mobile terminal, as shown in a sub-display area 330 of FIG. 3.

In this instance, the second application may be executed in response to an input of a gesture corresponding to the second application execution event, or may be executed through a hard key input or a touch button input.

The gesture identifying unit 120 may identify a gesture in accordance with a contact signal input to the display screen 170.

Specifically, the gesture identifying unit 120 may analyze an outline, shape, or path along which a pointer contacts the display screen 170. The pointer may contact the display screen 170 in the outline, shape, or path by being moved on the display screen 170 by a user. For simplification, the outline, shape, or path will be referred to inclusively as a shape. The gesture identifying unit 120 then may identify, in the event table 160, a gesture corresponding to the analyzed shape within an allowable range.

The gesture identifying unit 120 may analyze the shape as one or more characters using a character recognition module. Specifically, the shape in which the pointer is moved on the display screen 170 may be recognized as one or more certain characters, such as figures, signs, numbers, letters, punctuation, and the like, or any combination thereof, thereby permitting the mobile terminal to perform various control commands. Thus, a command associated with characters inputted by the user may be forwarded to the background application, thereby enabling a control with respect to the background application using more complex and precise commands.

The command event verifying unit 130 may verify a command event corresponding to the identified gesture, and the application controlling unit 140 may forward the verified command event to a first application to control the first application.

Specifically, the command event verifying unit 130 may verify, in the event table 160, a command event registered to correspond to the identified gesture. For example, the command event verifying unit 130 may verify, as the command event, at least one of a start reproduction start/stop event of a media file by the media player, an increase/decrease playback volume event of the media file, and a select next/previous music event of the media file being reproduced.

Figure 8:
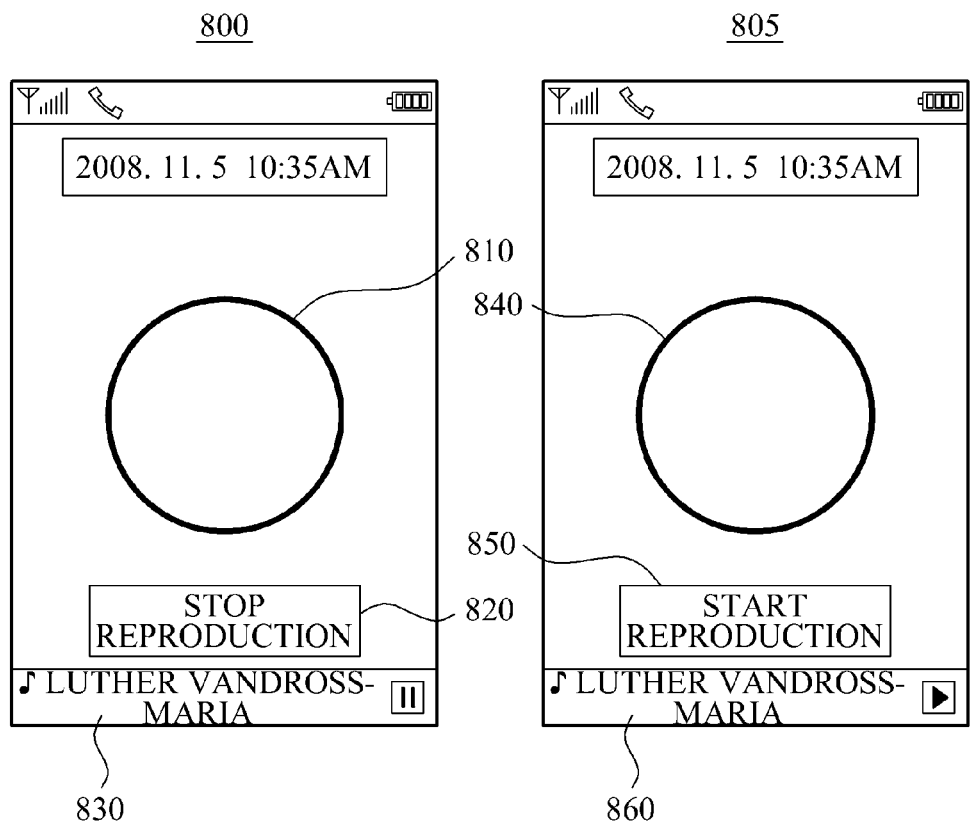
FIG. 8, FIG. 9, and FIG. 10 illustrate examples of controlling a first application being executed as a background application in a mobile terminal using a gesture in a system to control a mobile terminal application using a gesture according to an exemplary embodiment of the present invention.
Figure 9:
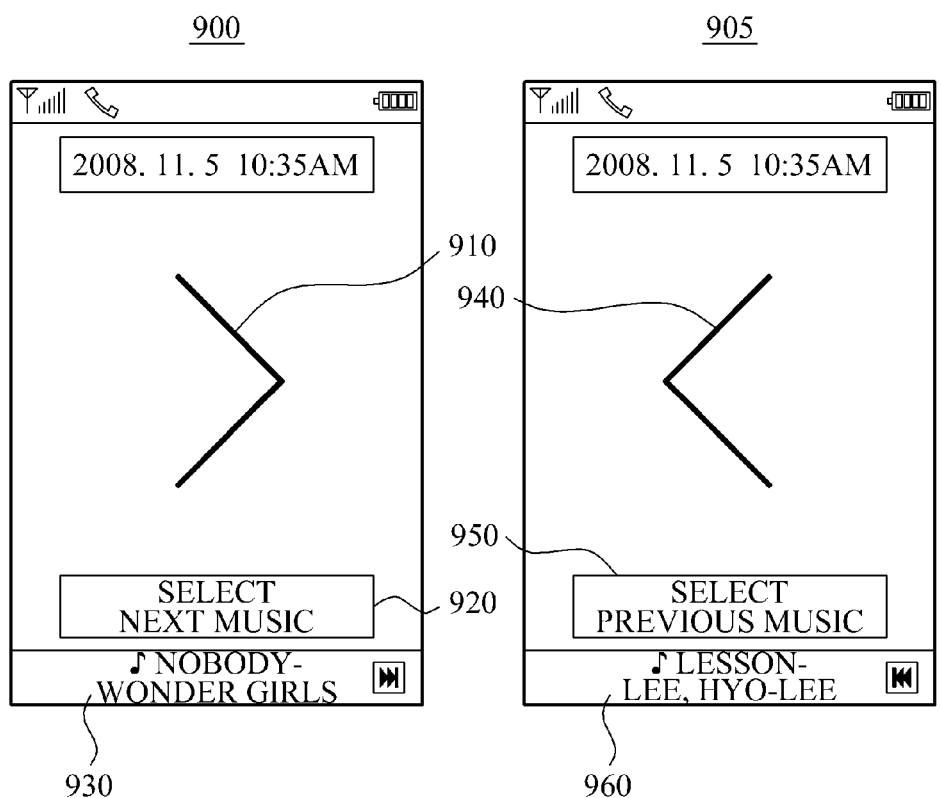
Figure 10:
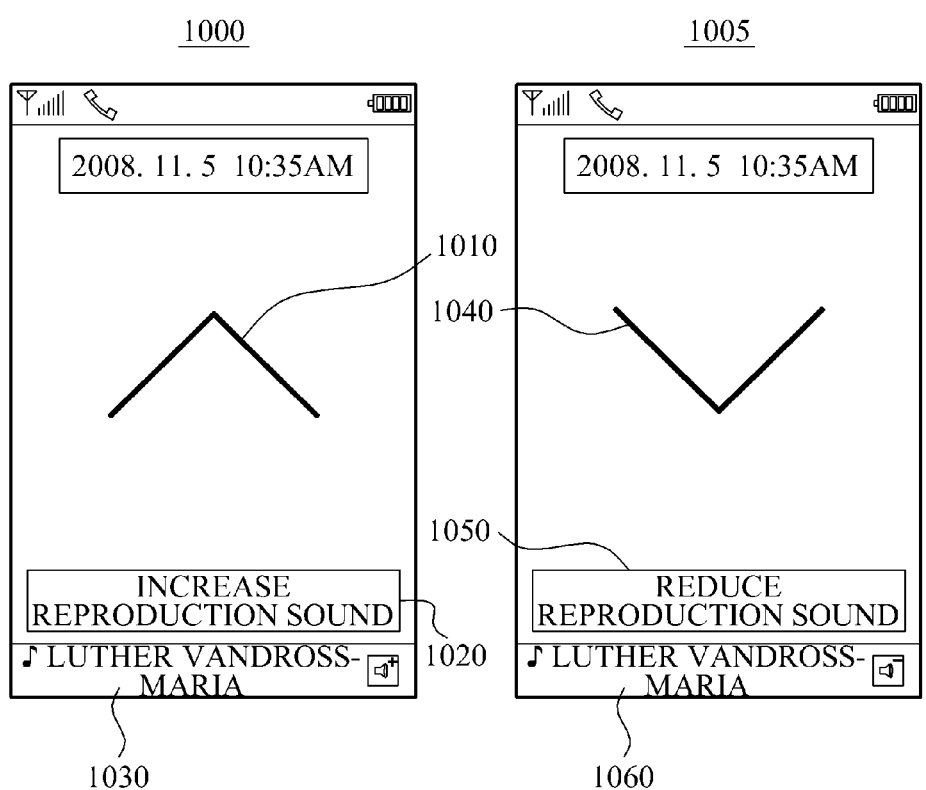

FIG. 8, FIG. 9, and FIG. 10 illustrate examples of controlling a first application being executed as a background application in a mobile terminal using a gesture in a system to control a mobile terminal application using a gesture according to an exemplary embodiment of the present invention.

As illustrated in a screen 800 of FIG. 8, a process of stopping the reproduction of a media in a 'music player' being executed as a background application in the mobile terminal using a gesture is shown.

For example, when a contact signal is generated on the display screen 170 of the mobile terminal while the 'music player' illustrated in a screen 800 of FIG. 8 is executed as the background application, the gesture identifying unit 120 may identify, in the event table 160, a gesture 810 corresponding to the contact signal. Also, the command event verifying unit 130 may verify a 'stop reproduction' event 820 of the media corresponding to the identified gesture 810. In addition, the application controlling unit 140 may forward the 'stop reproduction' event 820 to the 'music player' to stop a reproduction of the media in the 'music player' in accordance with the 'stop reproduction' event 820, as shown in a sub-display area 830 of FIG. 8.

As illustrated in a screen 805 of FIG. 8, a process of starting the reproduction of a media in the 'music player' being executed as a background in the mobile terminal using a gesture is shown.

For example, when a contact signal is generated on the display screen 170 of the mobile terminal while the 'music player' illustrated in a screen 805 of FIG. 8 is executed as the background application, the gesture identifying unit 120 may identify, in the event table 160, a gesture 840 corresponding to the contact signal. Also, the command event verifying unit 130 may verify a 'start reproduction' event 850 of the media corresponding to the identified gesture 840. In addition, the application controlling unit 140 may forward the 'start reproduction' event 850 to the 'music player' to start a reproduction of the media in the 'music player' in accordance with the 'start reproduction' event 850, as shown in a sub-display area 860 of FIG. 8.

As illustrated in a screen 900 of FIG. 9, a process of selecting next music in a reproduction of a media in a 'music player' being executed as a background application in the mobile terminal using a gesture is shown.

For example, when a contact signal is generated on the display screen 170 of the mobile terminal while the 'music player' illustrated in a screen 900 of FIG. 9 is executed as the background application, the gesture identifying unit 120 may identify, in the event table 160, a gesture 910 corresponding to the contact signal. Also, the command event verifying unit 130 may verify a 'select next music' event 920 of a media corresponding to the identified gesture 910. In addition, the application controlling unit 140 may forward the 'select next music' event 920 to the 'music player' to reproduce music of 'NOBODY-WONDER GIRLS' as the song after the currently presented media in the 'music player' in accordance with the 'select next music' event 920, as shown in a sub-display area 930 of FIG. 9.

As illustrated in a screen 905 of FIG. 9, a process of selecting previous music in a reproduction of a media in the 'music player' being executed as the background application in the mobile terminal using a gesture is shown.

For example, when a contact signal is generated on the display screen 170 of the mobile terminal while the 'music player' illustrated in a screen 905 of FIG. 9 is executed as the background application, the gesture identifying unit 120 may identify, in the event table 160, a gesture 940 corresponding to the contact signal. Also, the command event verifying unit 130 may verify a 'select previous music' event 950 of a media corresponding to the identified gesture 940. In addition, the application controlling unit 140 may forward the 'select previous music' event 950 to the 'music player ' to reproduce 'LESSON-LEE, HYO-LEE' as the previous song to the media being presently executed in the 'music player' in accordance with the 'select previous music' event 950, as shown in a sub-display area 960 of FIG. 9.

As illustrated in a screen 1000 of FIG. 10, a process of increasing a playback volume of a media in a 'music player' being executed as a background application in the mobile terminal using a gesture is shown.

For example, when a contact signal is generated on the display screen 170 of the mobile terminal while the 'music player' illustrated in a screen 1000 of FIG. 10 is executed as the background application, the gesture identifying unit 120 may identify, in the event table 160, a gesture 1010 corresponding to the contact signal. Also, the command event verifying unit 130 may verify an 'increase reproduction sound' event 1020 of a media corresponding to the identified gesture 1010. In addition, the application controlling unit 140 may forward the 'increase reproduction sound' event 1020 to the 'music player' to increase playback volume of the media being presently executed in the 'music player' in accordance with the 'increase reproduction sound' event 1020, as shown in a sub-display area 1030 of FIG. 10.

As illustrated in a screen 1005 of FIG. 10, a process of decreasing playback volume of a media in the 'music player' being executed as the background application in the mobile terminal using a gesture is shown.

For example, when a contact signal is generated on the display screen 170 of the mobile terminal while the 'music player' illustrated in a screen 1005 of FIG. 10 is executed as the background application, the gesture identifying unit 120 may identify, in the event table 160, a gesture 1040 corresponding to the contact signal. Also, the command event verifying unit 130 may verify a 'reduce reproduction sound' event 1050 of a media corresponding to the identified gesture 1040. In addition, the application controlling unit 140 may forward the 'reduce reproduction sound' event 1050 to the 'music player' to reduce playback volume of the media being presently executed in the 'music player' in accordance with the 'reduce reproduction sound' event 1050, as shown in a sub-display area 1060 of FIG. 10.

In the above descriptions, gestures applied to control the 'music player' being executed as the background application are visually illustrated on the display screen of the mobile terminal. Additionally, on the bottoms of each display 800, 805, 900, 905, 1000, and 1005, commands executed upon input of these gestures are shown. However, these images are shown only for convenience of description. Thus, the commands and gestures with respect to the background application may not be visually illustrated on the display screen when gestures are input to the mobile terminal. Rather, the mobile terminal may simply perform the command events without displaying any corresponding visual indications.

Also, the contact signal may include identification information about the first application corresponding to the gesture input to generate the contact signal. The command event verifying unit 130 may verify, in the event table 160, a registered command event corresponding to the gesture. Specifically, the gesture identifying unit 120 may identify, from the contact signal generated on the display screen 170, the identification information about the first application to be controlled, in addition to identifying the gesture. Thus, the command event verifying unit 130 may verify an event table associated with the first application using the identification information, and also may verify, in the verified event table, a command event corresponding to the identified gesture.

Also, upon receipt of a call request signal, the application controlling unit 140 may stop an execution of the first application, or stop the forwarding of a command event to the first application.

Specifically, when receiving a request for a voice/video communication at the mobile terminal, the application controlling unit 140 may suspend the first application such as the 'music player', the 'message transmission/reception program', and the like each being executed as the background application when a call is connected, or may prevent a control of the first application performed by the gesture from being implemented. Also, when the call is terminated, the application controlling unit 140 may re-execute the first application as the background application from a point where the first application had been suspended.

Thus, according to the exemplary embodiments, an application running as a background application may be controlled in the mobile terminal using a gesture even if the background application is not displayed on the mobile terminal display screen.

The system 100 to control an application of a mobile terminal using a gesture may include the application executing unit 110, the gesture identifying unit 120, the command event verifying unit 130, the application controlling unit 140, and the display screen 170.

The application executing unit 110 may execute applications of the mobile terminal, and determine a target application from among the plurality of applications based on a contact signal generated in the display screen 170.

The application executing unit 110 may execute the applications in the mobile terminal, and verify, from the contact signal generated in the display screen 170, identification information to determine the target application from among the applications.

The identification information may be information for specifying a target application to be controlled by the gesture.

For example, if a gesture '⊙' of the contact signal is generated while the 'music player' and 'the message transmission/reception program' are executed, the application executing unit 110 may determine, from the gesture '⊙', that the target application to be controlled is the 'message transmission/reception program' for email.

The gesture identifying unit 120 may identify a gesture in accordance with the contact signal.

Specifically, the gesture identifying unit 120 may analyze, from the contact signal, a shape in which a pointer contacts with the display screen 170 to thereby identify, in the event table 160, the gesture '⊙' corresponding to the analyzed shape within an allowable range.

The command event verifying unit 130 may verify a command event corresponding to the identified gesture, and the application controlling unit 140 may forward the verified command event to the target application to thereby control the target application.

For example, the command event verifying unit 130 may verify a 'transmission/reception execution' event corresponding to the identified gesture '502 ', and the application controlling unit 140 may forward the 'transmission/reception execution' event to the 'message transmission/reception program' determined as the target application. Then, if the identified gesture corresponds to a command event of transmitting/receiving a new email of the 'message transmission/reception program', then the new email of the 'message transmission/reception program' is transmitted/received in response to the identified gesture.

Thus, according to the exemplary embodiments, a gesture in accordance with the contact signal generated in the display screen may be identified without a key input via a keypad mounted in the mobile terminal, and a control with respect to the background application driven in the mobile terminal may be more easily performed using a command event corresponding to the gesture.

Also, according to the exemplary embodiments, the background application may be more easily controlled using a gesture while executed in the background of the mobile terminal. Specifically, according to the exemplary embodiments, a specific application driven in the mobile terminal may be controlled using a gesture while not being displayed on a screen, thereby increasing user convenience.

Also, according to the exemplary embodiments, an interface may be registered in an event table to correspond to a command event, so that a gesture used by a user may be registered through the interface, thereby more conveniently performing a control corresponding to the gesture with respect to a specific application being executed in the mobile terminal.

Figure 11:
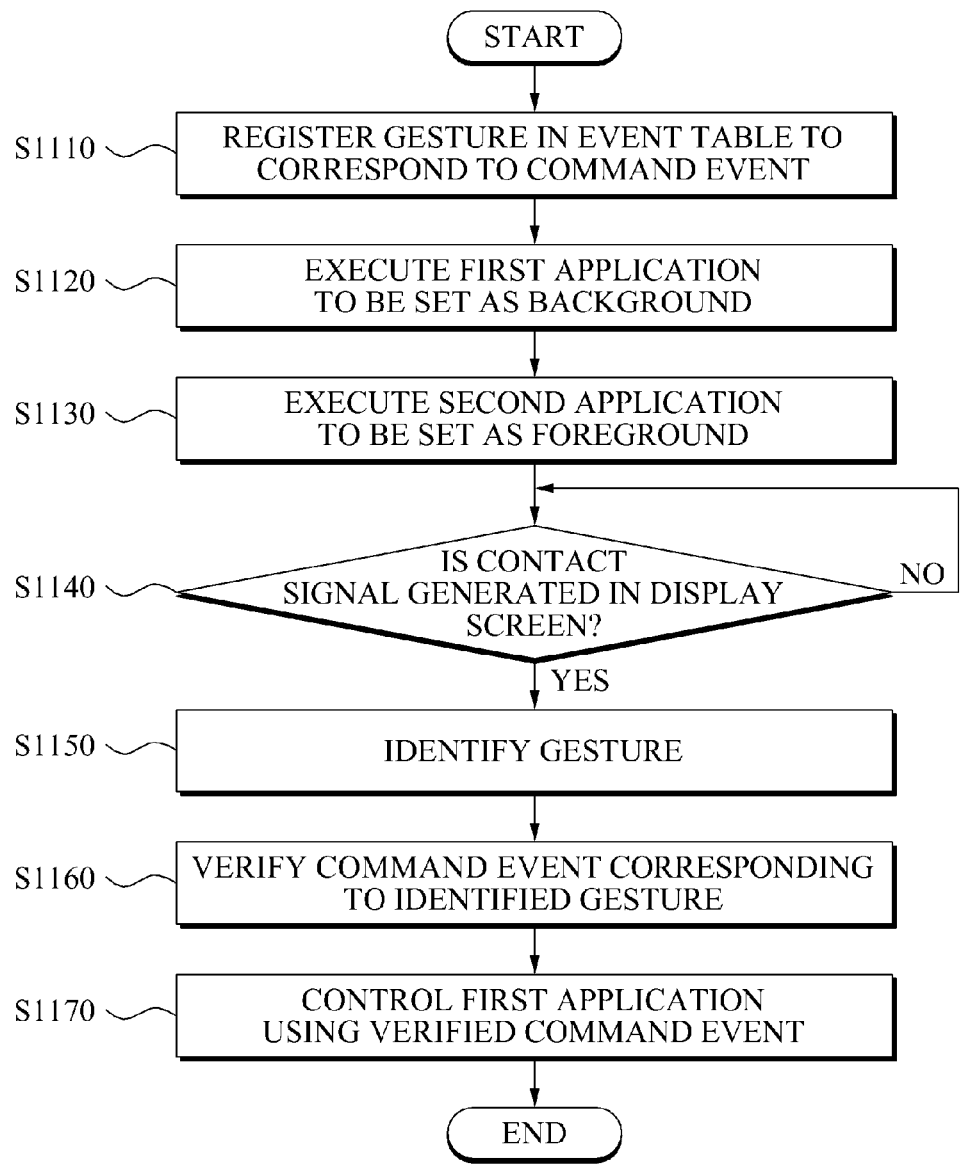
FIG. 11 is a flowchart illustrating a method for controlling a mobile terminal application using a gesture according to an exemplary embodiment of the present invention.

FIG. 11 is a flowchart illustrating a method for controlling an application of a mobile terminal using a gesture according to exemplary embodiment of the present invention.

The method may be implemented by the system 100 described above. Also, FIG. 11 will be described with reference to FIG. 1. However, this is for the ease of description only, and is not intended to limit the scope of the method in any way.

In operation S1110, the system 100 may provide an interface on a display screen 170 to register, in the event table 160, a gesture inputted through the interface to correspond to a command event.

For example, the registration unit 150 may provide, on the display screen 170 as illustrated in a screen 400 of FIG. 4, an interface about the 'start reproduction' event 430 of the media, with respect to the 'music player' as the application. The interface may include the gesture list 410 to be registered, and the gesture designated according to the selection 420 from the gesture list 410 may be registered in the event table 160 to correspond to the 'start reproduction' event 430.

In operation S1120, the system 100 may execute a first application, and in operation S1130, the system 100 may execute a second application being different from the first application. While the second application is executed, the execution of the first application is maintained. In this instance, the system 100 may set the first application as the background application and the second application as the foreground application.

For example, as illustrated in a screen 205 of FIG. 2, when the gesture 210 associated with the 'music player' execution event 220 is identified in a mobile terminal in which an application is not executed, the application executing unit 110 may execute the 'music player' as the first application, and display the executed 'music player' on the display screen 170.

In this instance, as illustrated in a screen 300 of FIG. 3, when the gesture 310 associated with the 'hold application' execution event 320 is identified on the display screen 170 while the 'music player' is being executed, the application executing unit 110 may execute the 'hold application' as the second application. In this instance, the application executing unit 110 may execute the 'music player' as the background application of the mobile terminal, as shown in a sub-display area 330 of FIG. 3.

In this instance, the second application may be automatically executed, or may be executed through a hard key input, a touch button input, or input of a gesture associated with an execution event of the second application.

In operation S1140, the system 100 may determine whether a contact signal is generated on the display screen 170, and if so, in operation S1150, the system may identify a gesture corresponding to the contact signal.

In operation S1160, the system 100 may verify a command event corresponding to the identified gesture, and in operation S1170, the system 100 may control the first application using the verified command event.

For example, as illustrated in a screen 800 of FIG. 8, when a contact signal is generated on the display screen 170 of the mobile terminal while the 'music player' is executed as the background application, the gesture identifying unit 120 may identify, in the event table 160, the gesture 810 corresponding to the contact signal, the command event verifying unit 130 may verify the 'stop reproduction' event 820 of the media corresponding to the identified gesture 810, and the application controlling unit 140 may stop a reproduction of the media in the 'music player' in accordance with the 'stop reproduction' event 820.

As described above, according to the exemplary embodiments, a gesture corresponding to the contact signal generated on the display screen may be identified without a key input via a keypad mounted in the mobile terminal, and a control with respect to a background application driven in the mobile terminal may be more easily performed using a command event corresponding to the gesture.

Figure 12:
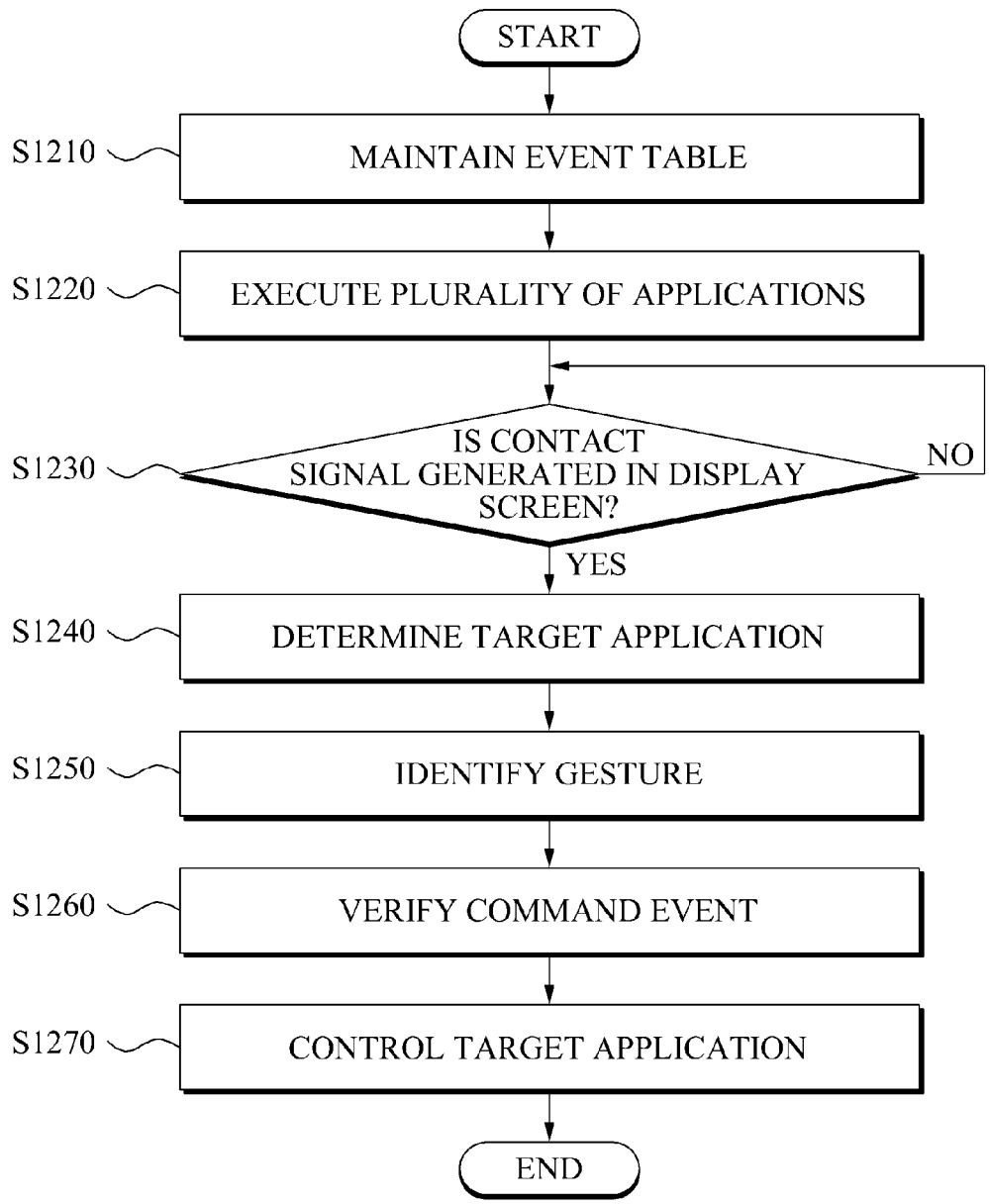
FIG. 12 is a flowchart illustrating a method for controlling a mobile terminal application using a gesture according to an exemplary embodiment of the present invention.

FIG. 12 is a flowchart illustrating a method for controlling an application of a mobile terminal using a gesture according to an exemplary embodiment of the present invention. As with the method described with respect to FIG. 11, this method may be performed by the system 100 described above, and will be described as such. However, this is for the ease of description, and is not intended to limit the scope of the method in any way.

In operation S1210, the system 100 may provide an interface on the display screen 170, and maintain the event table 160 where a gesture inputted through the interface is registered to correspond to a command event.

In operation S1220, the system 100 may execute two or more applications, and in operation S1230, the system 100 may determine whether a contact signal is generated on the display screen 170.

In operation S1240, if a contact signal is generated on the display screen 170, the system 100 may determine a target application from among the applications based on the contact signal.

For example, the application executing unit 110 may execute the 'music player' and the 'message transmission/reception program' from among the applications in the mobile terminal, and may verify, from the contact signal, identification information to determine that the 'music player' is the target application.

In this instance, the application executing unit 110 may execute the 'music player' as the background application, and display the 'message transmission/reception program' as the foreground application on the display screen 170.

In operation S1250, the system 100 may identify a gesture corresponding to the contact signal. In operation S1260, the system 100 may verify a command event corresponding to the identified gesture, and in operation S1270, the system 100 may control the determined target application using the verified command event.

For example, the command event verifying unit 130 may verify the 'stop reproduction event' of the media corresponding to the identified gesture, and the application controlling unit 140 may stop the reproduction of the media in the 'music player' in accordance with the 'stop reproduction event'.

As described above, according to the exemplary embodiment, a specific application driven in the mobile terminal may be controlled using a gesture even though the application is not displayed on the display screen or is a background application, thereby providing user convenience.

The method for controlling the application using the gesture according to the exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for controlling a mobile terminal application using a gesture, comprising:
   executing a first application;
   executing a second application while executing the first application, the first application being executed in a background without displaying a control interface of the first application;
   determining the first application as a target application based on an application selection gesture if multiple background applications are being executed, and determining the first application as the target application without the application selection gesture if the first application is the only background application being executed;
   identifying a target application control gesture corresponding to a contact signal, the contact signal being generated on a display screen in which a control interface of the target application is not displayed;
   verifying a command event corresponding to the target application control gesture;
   forwarding the command event to the determined target application; and
   controlling the first application to perform the command event in a background application state if the first application is determined as the target application.

2. The method of claim 1, wherein identifying the target application control gesture comprises:
   analyzing, from the contact signal, a shape in which a pointer contacts the display screen of the mobile terminal, and
   identifying, in an event table, a gesture corresponding to the shape within a range.

3. The method of claim 2, wherein analyzing the shape comprises:
   analyzing the shape as one or more characters using a character recognition module.

4. The method of claim 1, further comprising:
   registering, in an event table, the target application control gesture inputted through an interface to correspond to the command event,
   wherein verifying of the command event comprises:
   verifying, in the event table, that the command event is registered to correspond to the target application control gesture.

5. The method of claim 1, wherein the application selection gesture corresponds to identification information about the first application, and the verifying the command event comprises:
   verifying, in an event table, that the command event of the first application is registered to correspond to the target application control gesture.

6. The method of claim 1, wherein the first application is a media player, and the command event comprises:
   at least one of a start/stop reproduction event of a media by the media player, an increase/decrease playback volume event, and a selection event of the media being reproduced.

7. The method of claim 1, further comprising:
   stopping an execution of the first application or stopping the forwarding of the verified command event to the first application, upon receiving a call request signal.

8. The method of claim 1, further comprising:
   executing the first application or the second application if a gesture associated with an application execution event for the first application or the second application, respectively, is identified.

9. A method for controlling a mobile terminal application using a gesture, comprising:
   executing a plurality of applications;
   determining a target application from among the plurality of executed applications based on a contact signal generated in a display screen if multiple background applications are being executed, and determining a first application as the target application without the contact signal if the first application is the only background application being executed, the target application being executed in a background without displaying a control interface of the target application;
   identifying a gesture corresponding to the contact signal, the contact signal being generated on the display screen in which the control interface of the target application is not displayed;
   verifying a command event corresponding to the gesture;
   determining whether the command event corresponding to the gesture is a command event of the target application;
   forwarding the command event to the determined target application; and
   controlling the target application to perform the command event in a background application state if the command event is a command event of the target application.

10. A system to control a mobile terminal application using a gesture, comprising:
    an application executing unit to execute a first application, and to execute a second application while executing the first application as a background application, the first application being executed in a background without displaying a control interface of the first application;
    a gesture identifying unit to identify a target application control gesture corresponding to a contact signal, the contact signal being generated on a display screen in which a control interface of a target application is not displayed;

a command event verifying unit to verify a command event corresponding to the target application control gesture; and a processor comprising an application controlling unit to forward the command event to the determined target application, and to control the target application to perform the command event in a background application state, wherein the application executing unit further determines the first application as the target application based on an application selection gesture if multiple background applications controllable by the target application control gesture are being executed, and determines the first application as the target application without the application selection gesture if the first application is the only background application being executed.

11. The system of claim 10, wherein the gesture identifying unit analyzes, from the contact signal, a shape in which a pointer contacts the display screen, and the gesture identifying unit identifies, in an event table, a gesture corresponding to the shape within a range.

12. The system of claim 11, wherein the gesture identifying unit analyzes the shape as one or more characters using a character recognition module.

13. The system of claim 10, further comprising:

a registration unit to provide an interface to the display screen, and to register, in an event table, the target application control gesture inputted through the interface to correspond to the command event, wherein the command event verifying unit verifies, in the event table, that the command event is registered to correspond to the target application control gesture.

14. The system of claim 10, wherein the application selection gesture corresponds to identification information about the first application, and the command event verifying unit verifies, in an event table, that the command event is registered to correspond to the target application control gesture.

15. The system of claim 10, wherein the first application is a media player, and the command event comprises at least one of a start/stop reproduction event of a media by the media player, an increase/decrease playback volume event, and a selection event of the media being reproduced.

16. The system of claim 10, wherein the application controlling unit stops an execution of the first application, or stops the forwarding of the verified command event to the first application, upon receiving a call request signal.

17. The system of claim 10, wherein the application executing unit executes the first application or the second application if a gesture associated with an application execution event of the first application or the second application, respectively, is identified.

18. A system to control a mobile terminal application using a gesture, comprising:

an application executing unit to execute a plurality of applications, to determine a target application from among the plurality of executed applications based on a contact signal generated in a display screen if multiple background applications are being executed, and to determine a first application as the target application without the contact signal if the first application is the only background application being executed, the target application being executed in a background without displaying a control interface of the target application;

a gesture identifying unit to identify a gesture corresponding to the contact signal, the contact signal being generated on the display screen in which the control interface of the target application is not displayed;

a command event verifying unit to verify a command event corresponding to the gesture, and to determine whether the command event corresponding to the gesture is a command event of the target application; and a processor comprising an application controlling unit to forward the command event to the determined target application, and to control the target application to perform the command event in a background application state if the command event is a command event of the target application.

19. A mobile terminal, comprising the system of claim 10.

20. A mobile terminal, comprising the system of claim 18.

* * * * *